June 17, 1952  G. S. LODWICK  2,600,787
HACKSAW MACHINE
Filed May 10, 1948  4 Sheets-Sheet 1
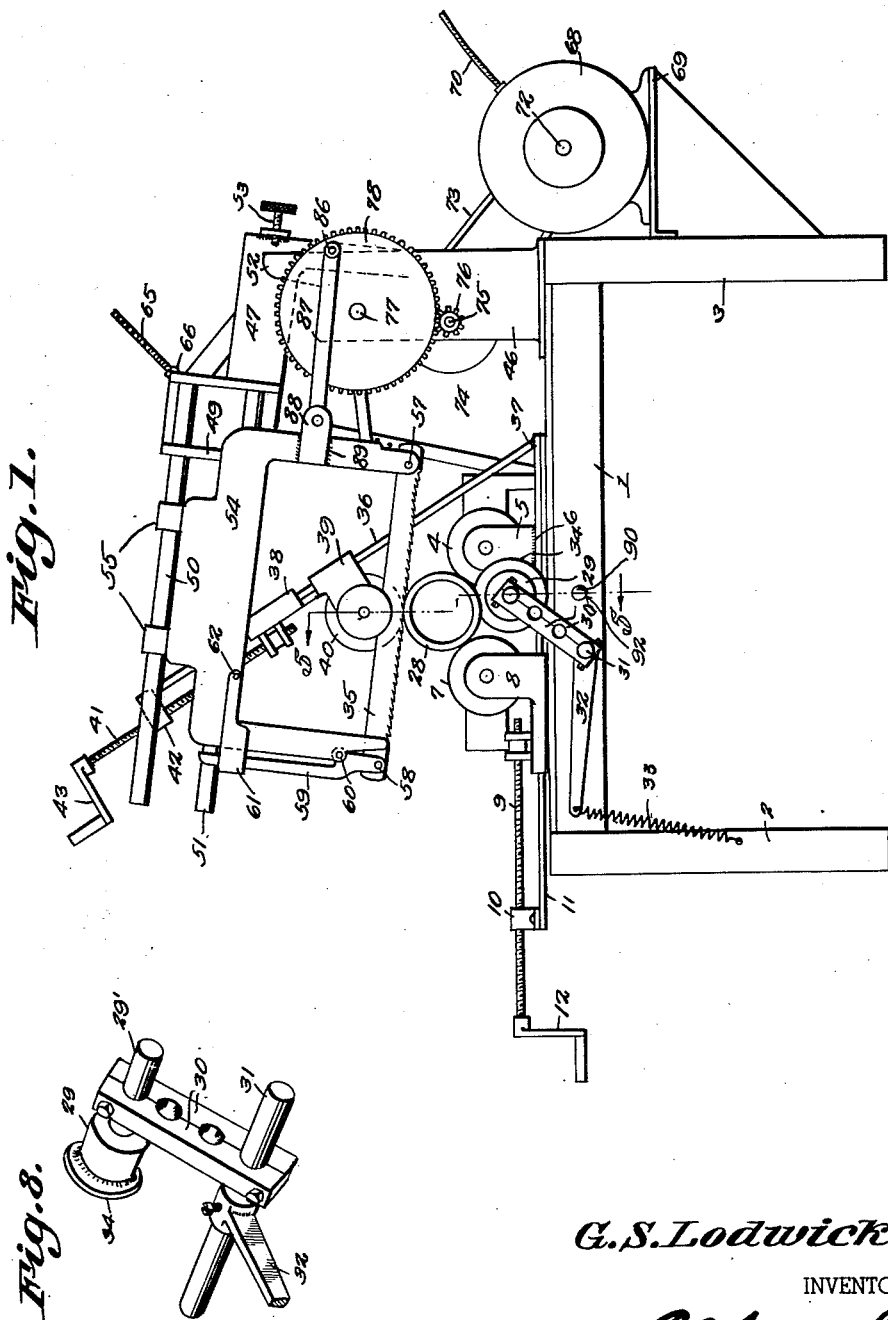
G. S. Lodwick
INVENTOR
BY CA Snow & Co.
ATTORNEYS.

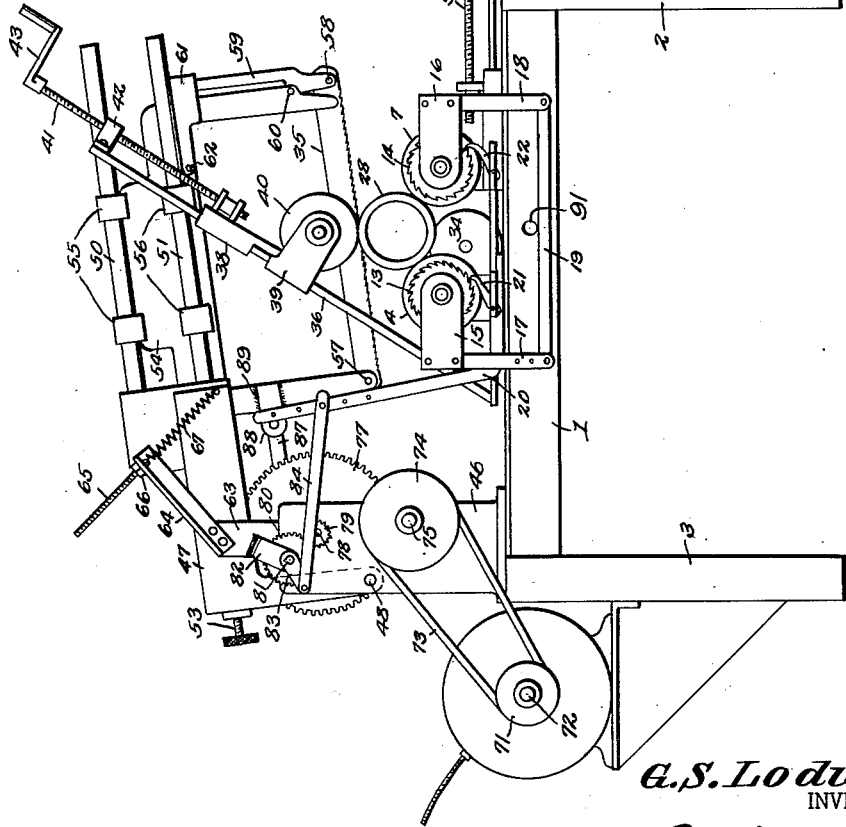

June 17, 1952     G. S. LODWICK     2,600,787
HACKSAW MACHINE
Filed May 10, 1948     4 Sheets-Sheet 3
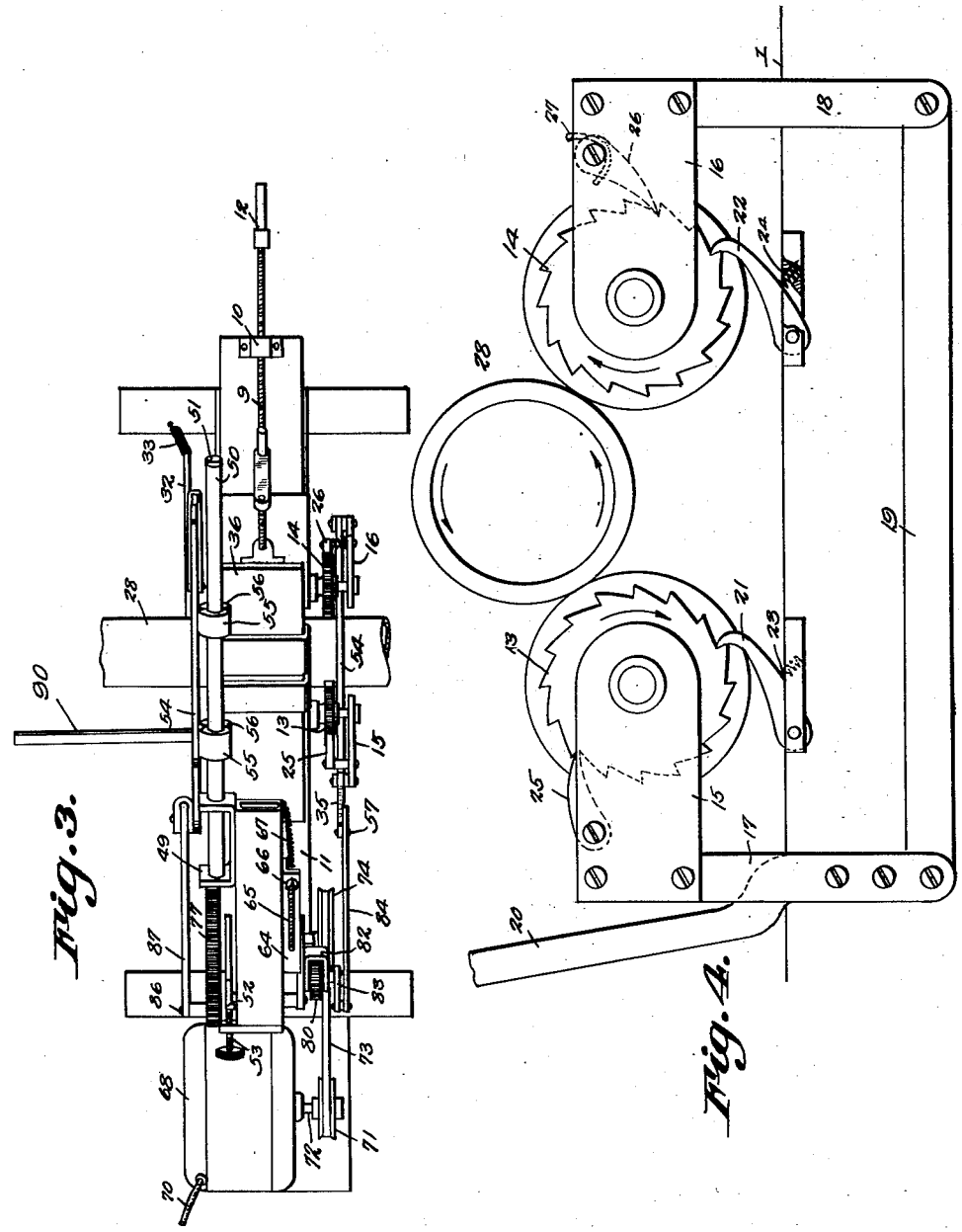
G. S. Lodwick
INVENTOR
BY
ATTORNEYS.

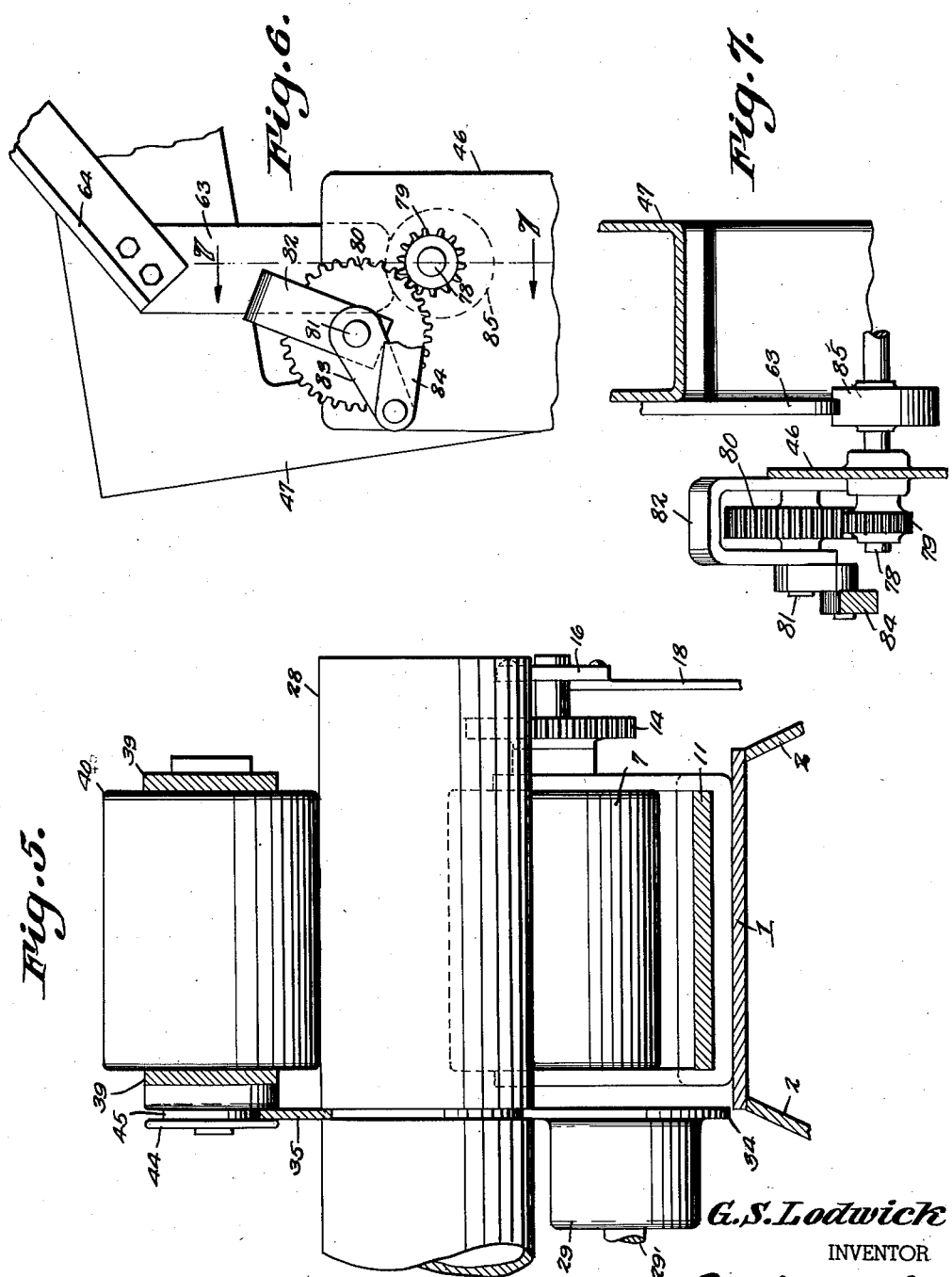

Patented June 17, 1952

2,600,787

UNITED STATES PATENT OFFICE 2,600,787

HACKSAW MACHINE

Gwylim S. Lodwick, Mystic, Iowa

Application May 10, 1948, Serial No. 26,027

3 Claims. (Cl. 29—73)

This invention relates to an improved hack saw machine, for more accurate cutting of round bars and tubing.

An object of the invention is to provide an improved form of motor driven hack saw machine.

Another object of the invention is to provide an improved motor driven reciprocating saw blade hack saw machine.

A further object of the invention is to provide an improved motor driven hack saw machine which will support the work to be cut upon a pair of rollers which will rotate the work as the sawing operation is carried on.

A still further object of the invention is to provide an improved motor driven hack saw machine which will support the work upon a pair of rollers for rotating the work as the sawing operation is carried on, and a cooperating pressure roller for contacting the work for firmly holding the same upon the supporting rollers.

Another object of the invention is to provide an improved form of motor driven hack saw machine which will rotate the work as it is being cut, and further means for limiting the depth of the saw cut and for preventing the saw from operating below a desired level.

Another object of the invention is to provide an improved motor driven hack saw machine which will be highly efficient in operation, and relatively inexpensive to manufacture and produce.

Other objects will appear as the description proceeds.

In the accompanying drawings which form a part of this application:

Figure 1 is a side elevation of the improved motor driven hack saw machine.

Fig. 2 is a side elevation of the improved motor driven hack saw machine taken from the opposite side as shown in Fig. 1.

Fig. 3 is a plan view of the improved motor driven hack saw machine.

Fig. 4 is an enlarged detail side elevation of the ratchet operated work supporting rollers with a tubular work piece supported thereon.

Fig. 5 is a sectional view taken on the line 5—5 of Fig. 1.

Fig. 6 is an enlarged detail side elevation of the gearing and eccentric means for raising the saw blade on its backward stroke.

Fig. 7 is a front elevation of the gearing and eccentric means for raising the saw blade on its backward stroke.

Fig. 8 is a perspective view of the work engaging flanged roller for preventing longitudinal movement of the work while being cut off by the hack saw.

Fig. 9 is a perspective view of a gauge or stop for use in cutting predetermined lengths of material.

Like characters of reference are used throughout the following specification and the accompanying drawing to designate corresponding parts.

In carrying out the invention, there is provided a bench support 1 having downwardly and outwardly extending legs 2 and 3 at its opposite ends.

A transversely extending work supporting roller 4 is supported in fixed position upon the bench support 1 by means of the brackets 5 welded at 6 to the bench support 1. A cooperating transversely extending work supporting roller 7 is slidably and adjustably supported upon the bench support 1 by means of the carriage 8 which is connected with the adjusting screw 9 for movement toward and away from the roller 4. A fixed nut 10 is supported in fixed position upon the guide plate 11 on the bench support 1, and a crank handle 12 is provided for the outer end of the screw 9.

Ratchets 13 and 14 are secured to an end of each work supporting roller 4 and 7, and brackets 15 and 16 are also connected with said rollers 4 and 7, the same being connected together by means of the depending arms 17 and 18 and connecting bar or arm 19.

An L-shaped pawl actuating arm 20 supports the pivoted pawls 21 and 22 for engagement with the ratchets 13 and 14, respectively, said pawls being resiliently forced into engagement with said ratchets 13 and 14 by means of the coil springs 23 and 24.

Pivoted checking or reverse movement pawls 25 and 26 are supported by the brackets 15 and 16, and are resiliently tensioned by the springs 27.

A tubular piece of work 28 or a solid round rod (not shown) will be supported upon the work supporting rollers 4 and 7.

A device for preventing longitudinal movement or slipping of the piece of work 28 when disposed upon the work supporting rollers 4 and 7 comprises a flanged roller 29 mounted upon the stub shaft 29' supported in the two-piece clamp arms 30. The lower ends of the clamp arms 30 will be secured to the pivot rod 31, and a tensioning arm 32 secured to the pivot rod 31 will be resiliently urged downwardly by means of the coil spring 33 secured to the outer end of the tensioning arm 32 and to the leg 2. The peripheral upstanding flanges 34 on the roller 29 will seat in the annular slot formed in the work 28 made by the reciprocating hack saw blade 35 as the work 28 is rotated by means of the ratchets 13 and 14 and their cooperating pivoted pawls 21 and 22.

An upwardly extending angularly disposed metal supporting strip 36 is welded at 37 to the end of the guide or base plate 11, and slidably and adjustably supports the carriage 38 which includes the oppositely disposed bracket arms 39 between which a pressure roller 40 is rotatably mounted for contacting the top surface of the work 28. An adjusting screw 41 is threaded through a nut 42 at the upper end of the strip 36 and is threadably engaged with the carriage 38, whereby when the hand crank 43 on the outer and upper end of the screw 41 is rotated, the roller 40 will be positively moved toward or away from the work 28. One end of the roller 40 will be formed with a peripheral flange 44 and a peripheral slot 45, the upper edge of the saw blade 35 being adapted to ride in the slot 45 to hold it in firm contact with the work 28 during the sawing operation, and to prevent endwise movement of the work 28.

A supporting post 46 is fixed in vertical position upon the end of the bench support 1, and pivotally supports the inverted L-shaped saw frame supporting head 47 upon the pivot pin or bolt 48.

A U-shape bracket 49 is secured to the outer end of the head 47 and supports the vertically spaced parallel outwardly extending saw bearing guide rods 50 and 51.

The stop arm 52 is supported by the post 46 and is engageable by the adjusting screw 53 carried by the head 47 for selectively limiting the downward cutting limit of the saw blade 35.

An inverted U-shape saw frame 54 is provided with transversely spaced upper and lower bearing loops 55 and 56 slidably and reciprocably mounted upon the bearing guide rods 50 and 51. The saw blade 35 is supported upon the pin 57 at its inner end with its outer end being supported upon the pin 58 carried by the lever 59 pivoted at 60 to the outer depending arm of the saw frame 54. A keeper member 61 pivoted at 62 upon the saw frame 54 for positioning about the upper end of the lever 59 to hold the saw blade 35 rigid in the frame 54.

An arm 63 is secured to the post 46 and supports the upwardly extending angle piece or arm 64, through which the adjusting screw 65 is mounted, being held by the nut 66. A coil spring 67 is mounted between the screw 65 and the head 47 urging the saw frame upwardly on its inward stroke while the ratchets 13 and 14 are rotating the work 28.

The driving means for the hack saw machine includes an electric motor 68 which is supported upon the shelf 69 secured between the legs 3 of the bench support 1, and an electric conductor 70 will be connected between the motor 68 and a source of electric current supply (not shown). A pulley 71 on the motor shaft 72 is connected by the bolt 73 to a larger pulley 74 on one end of the shaft 75. A small gear 76 on the opposite end of the shaft 75 meshes with a large gear 77 on the end of shaft 78, and a small gear 79 is fixed on the opposite end of the shaft 78. The small gear 79 meshes with a larger gear 80 mounted on the shaft 81 disposed between the yoke 82 secured to one side of the supporting post 86.

The crank arm 83 is fixed to the shaft 81 to which the gear 80 is fixed, and the outer end of the arm 83 is pivotally connected to the connecting rod 84, whose opposite end is adjustably and pivotally attached to the L-shape ratchet supporting and operating arm 20, whereby the ratchets 21 and 22 rotate the work supporting rollers 4 and 7 to rotate the work 28 as the saw 35 and saw frame 54 are moved upwardly from the work 28 on their inward strokes. The lower end of the arm 63 is formed with a rounded end for engagement with the eccentrics 85 secured on the shaft 79 to provide for the raising of the saw blade 35 and the saw frame 54 between the cutting strokes of the saw blade 35.

An eccentric pin 86 is supported on the large gear 78 and is connected by the connecting rod 87 with the ear 88 welded at 89 to the saw frame 54 for reciprocating the same as the electric motor 68 is operated.

From the foregoing description it will be apparent that either tubular or round work 28 may be firmly supported upon the rollers 4 and 7 and held by the upper roller 40, and that the work will be held from longitudinal shifting as the sawing operation is carried on, due to the flanges 34 and 44 which ride in the slot in the work 28 made by the saw blade 35 as the work is rotated by means of the ratchets 13 and 14 and pawls 21 and 22. Also, the distance of cut away may be limited or set by means of the screw 53.

As shown by Fig. 9 of the drawings, I have provided an attachment which may be mounted on the bench support 1, the attachment embodying the supporting rod 90 that extends through the openings 91 and 92 formed in the bench support, the rod being secured within the openings. This rod 90 extends an appreciable distance beyond the side of the bench support 1 where it provides a support for the securing block 93 which is provided with an opening to receive the rod 90, the securing block being clamped to the rod 90 by means of the bolt 94. This securing block is also provided with a bore in which the arm 15 is secured, the arm 95 having a head 96 which is formed with a threaded opening to receive the threaded shank 97 of the stop or gauge. The means for holding the arm 95 on the securing block, permits the arm 95 to be moved to various positions to support the member 97 directly opposite to the end of the rod being cut, to hold the rod which is moved into engagement therewith, to a predetermined position where it may be cut by the saw. With this device it is obvious that a number of rods may be accurately cut to predetermined lengths, the operator merely sliding one end of the rod, which in the present showing is indicated by the reference character A, into contact with the member 97.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. In a cylindrical work clamp for hack saw machines, a bench, a pair of spaced horizontal supporting rollers mounted on the bench, means for adjusting one of said rollers with respect to the other roller providing a support between which the work is held, a work engaging roller mounted above the supporting rollers adapted to rest on the work at the top thereof, manually adjustable means for directing pressure against the work engaging roller, feeding the work engaging roller to the work, and ratchet means for simultaneously rotating said work supporting rollers and work resting thereon.

2. In a work clamp for power hack saw machines, a bench, a pair of horizontally spaced supporting rollers mounted on the bench, ratchet teeth formed on the ends of the supporting rollers, a pawl actuating arm pivotally mounted on the bench under the supporting rollers, pawls mounted on the pawl actuating arm engaging said ratchet teeth whereby movement of said pawl-actuating arm rotates the supporting rollers and work resting thereon, an inclined supporting strip secured to the bench extending above the supporting rollers, a carriage movable on said work supporting strip, a pressure roller mounted on the carriage resting on the work, an adjustable screw mounted on said supporting strip connected with the carriage, adapted to force the carriage and pressure roller towards the work during sawing of the work.

3. In a work clamp for power hack saw machines, a bench, a pair of spaced horizontal supporting rollers, mounted on the bench, between which tubular work being sawed is supported, means for rotating the supporting rollers rotating the work, an upper pressure roller engaging the work above the supporting rollers, means for adjusting the upper pressure roller towards and away from the work, a roller having an annular flange operating under the work, and said flange moving in the saw cut in the work, holding the work against lateral movement on the bench.

GWYLIM S. LODWICK.

REFERENCES CITED

The following references are of record in the file of this patent:

UNITED STATES PATENTS

| Number | Name | Date |
|---|---|---|
| 686,600 | Fellows | Nov. 12, 1901 |
| 769,265 | Liebert | Sept. 6, 1904 |
| 925,684 | Couper | June 22, 1909 |
| 1,059,225 | Sherrill | Apr. 15, 1913 |
| 1,061,940 | Hock | May 13, 1913 |
| 1,281,161 | Hochstein | Oct. 8, 1918 |
| 1,655,588 | Baumann | Jan. 10, 1928 |
| 1,880,875 | Deutsch | Mar. 11, 1929 |
| 1,908,695 | Deutsch | May 16, 1933 |

FOREIGN PATENTS

| Number | Country | Date |
|---|---|---|
| 36,045 | Denmark | May 17, 1926 |
| 122,196 | Great Britain | Jan. 7, 1919 |